US005352507A

United States Patent [19]

[11] Patent Number: 5,352,507

[45] Date of Patent: Oct. 4, 1994

Bresson et al.

[54] SEAMLESS MULTILAYER PRINTING BLANKET

[75] Inventors: Michel Bresson, Whittelsheim, France; David Beckerman, Andover, Mass.; Claude Berna, Moosch, France; Christian Chesneau, Wuenheim, France; Jean P. Jenny, Hatstatt, France; Dennis D. O'Rell, Roxborough, Mass.; Herve Praet, Mulhouse, France; Gerard Rich, Orschwihr, France; Jean P. Stutz, Vieux Thann, France

[73] Assignee: W. R. Grace & Co.-Conn., New York, N.Y.

[21] Appl. No.: 25,482

[22] Filed: Mar. 3, 1993

Related U.S. Application Data

[63] Continuation-in-part of Ser. No. 682,048, Apr. 8, 1991, Pat. No. 5,205,213.

[51] Int. Cl.[5] .......... B32B 9/00

[52] U.S. Cl. .......... 428/245; 428/909; 428/246; 428/250; 428/283; 428/304.4

[58] Field of Search .......... 428/246, 909, 250, 283, 428/245, 304.4

[56] References Cited

U.S. PATENT DOCUMENTS

| | | | |
|---|---|---|---|
| 1,608,206 | 11/1926 | Freedlander . | |
| 1,804,139 | 5/1931 | Adsit . | |
| 2,054,620 | 9/1936 | Freedlander | 101/217 |
| 2,193,899 | 3/1940 | Casto et al. | 154/4 |
| 3,578,544 | 5/1971 | Thorsrud | 161/59 |
| 3,750,250 | 8/1973 | Brown | 29/148.4 D |
| 3,983,287 | 9/1976 | Goosen et al. | 428/241 |
| 4,043,013 | 8/1977 | Zeppernick et al. | 29/132 |
| 4,043,142 | 8/1977 | Marshall | 66/170 |
| 4,061,818 | 12/1977 | Duckett et al. | 428/246 |
| 4,093,764 | 6/1978 | Duckett et al. | 428/113 |
| 4,224,370 | 9/1980 | Heinemann | 428/246 |
| 4,298,680 | 11/1981 | Bruno | 430/300 |
| 4,303,721 | 12/1981 | Rodriguez | 428/213 |
| 4,378,622 | 4/1983 | Pinkston et al. | 29/148.4 D |
| 4,528,214 | 7/1985 | Long et al. | 427/173 |
| 4,548,858 | 10/1985 | Meadows | 428/224 |
| 4,554,040 | 11/1985 | van der Velden | 156/215 |
| 4,559,188 | 12/1985 | Tassone et al. | 264/24 |
| 4,685,393 | 8/1987 | Saueressig | 101/375 |
| 4,812,357 | 3/1989 | O'Rell et al. | 428/246 |
| 4,903,597 | 2/1990 | Hoage et al | 101/401.1 |

FOREIGN PATENT DOCUMENTS

| | | |
|---|---|---|
| 2026954 | 4/1991 | Canada . |
| 1217981 | 12/1960 | Fed. Rep. of Germany . |
| 0132771 | 11/1978 | Fed. Rep. of Germany . |
| 200937 | 11/1978 | Fed. Rep. of Germany . |
| 2816703 | 10/1979 | Fed. Rep. of Germany . |
| 0388740 | 3/1990 | Fed. Rep. of Germany . |
| 1549507 | 8/1979 | United Kingdom . |
| 2024104 | 1/1980 | United Kingdom . |

OTHER PUBLICATIONS

U.S. patent application Ser. No. 07/699,668; Title Gapless Tubular Printing Blanket; Inventors: J. B. Vrotacroe, G. A. Guaraldi, J. R. Calson, G. T. Squires; filed: May 14, 1991.

*Primary Examiner*—Patrick J. Ryan
*Assistant Examiner*—Kam F. Lee
*Attorney, Agent, or Firm*—Craig K. Leon; William L. Baker

[57] ABSTRACT

A novel multilayered sleeve-like printing blanket is mountable on gapless cylinders or tubular blanket carriers, thereby minimizing vibration when operated at high rotational speeds. An exemplary printing blanket comprises a seamless outer printing surface layer; at least one reinforced elastomer layer, the elastomer layer being reinforced by fibers substantially parallel with the inward and outward sides of the cylindrical tube defined by the reinforced elastomer layer; and a resiliently compressible layer. The oriented fibers reinforce the elastomer layer such that the modulus of elasticity in the circumferential direction of rotation is increased. Exemplary methods for forming one or more of the layers are also disclosed herein.

29 Claims, 4 Drawing Sheets

FIG. 3
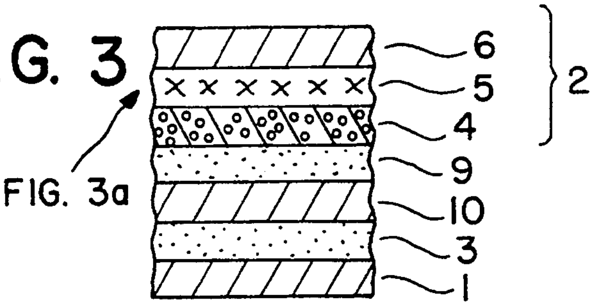
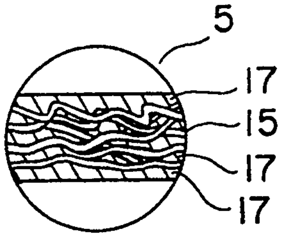
FIG. 3a
FIG. 4
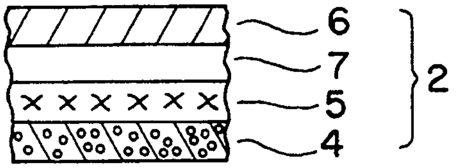
FIG. 5
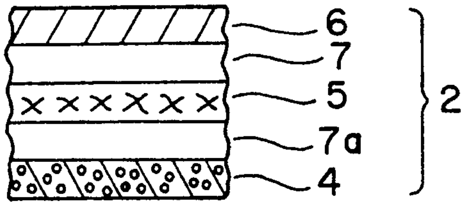
FIG. 6
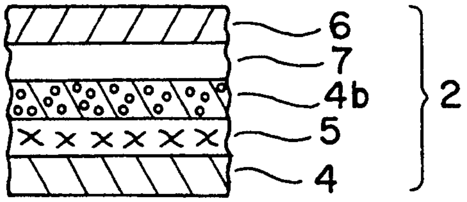
FIG. 7
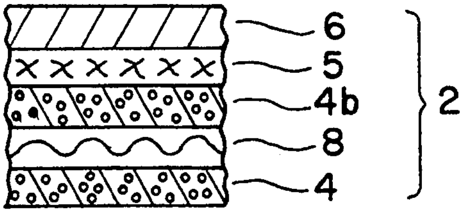
FIG. 8
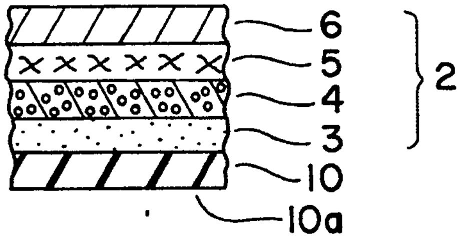

SEAMLESS MULTILAYER PRINTING BLANKET

This is a continuation-in-part of U.S. patent application Ser. No. 07/682,048, filed Apr. 8, 1991, issued Apr. 27, 1993, as U.S. Pat. No. 5,205,213.

FIELD OF THE INVENTION

The present invention relates to the filed of printing blankets, and more particularly to a seamless and resiliently compressible multi-layer printing blanket and method for making the same.

BACKGROUND OF THE INVENTION

It is known in offset printing to use cylinders lined with a printing blanket to permit the printing of a paper web which is pinched and driven between cylinders. Previously, the blankets were fastened onto the cylinders with their ends entered and locked into a longitudinally extending gap in the cylinder. This caused a number of inconveniences. In effect, the confronting ends of the blanket necessarily left a certain space therebetween, so that the paper web exhibited unprinted areas. Moreover, this way of fastening blankets into "gapped" cylinders imparted to the cylinder-blanket assembly a dissymmetry which generated vibrations during the rotation of the cylinder. Therefore, the speed and the efficiency of the printing machines was necessarily limited.

Gapped cylinders created a problem known as "fall off at the gap" for printing blankets having a fabric layer located between a printing surface and compressible foam layer. The fabric compressed the foam near the gap because it could not elongate sufficiently, and consequently decreased printing sharpness. U.S. Pat. Nos. 4,303,721 and 4,812,357 disclosed the use of an elastomer between the printing and foam layers to avoid fall off at the gap.

It is known that "seamless" and resiliently compressible blankets can be mounted around gapless cylinders in the manner of a continuous tube or sleeve.

For example, U.S. Pat. Nos. 3,983,287 and 4,378,622 disclosed tubular outer layers disposed around an inner compressible layer. The Canadian Patent Application No. 2,026,954 of Gaffney et al. suggested that a compressible foam layer disposed directly beneath a printing surface layer was needed to avoid bulges on either side of nip during operation, although it was also suggested that fabric could be inserted between layers.

U.S. patent application Ser. No. 07/682,048 of Bresson, filed Apr. 8, 1991, on the other hand disclosed a seamless blanket in which at least one hard elastomer layer, e.g. a substantially non-compressible material such as cured rubber, was employed between a surface printing layer and a compressible layer to minimize vibration in the blanket at high rotational velocities. The elastomer could optionally be reinforced with fibers. The multi-layered blanket was seamless in that it could be mounted around a cylinder without any surface interruptions, in the manner of a sleeve, thus permitting axial symmetry and allowing printing machines using such cylinders to operate at high speeds with minimum vibration.

Because seamless blankets are not secured by gaps in the cylinder, new problems arise regarding blanket installation and mounting, the avoidance of creeping or slippage during rotation, and removal after use, to name but a few. Unitary, cylindrically-shaped blankets can be axially mounted or dismounted on cylinders using compressed air, which is passed in a substantially radial direction from holes located within the cylinder. For example, U.S. Pat. No. 4,903,597 of Hoage et al. teaches that compressed air or gas is used to expand the sleeve to a limited extent for facilitating mounting and dismounting operations.

Thus, seamless blankets must be sufficiently resilient to provide compressibility for generating nip pressure; and yet they must have sufficient dynamic stability such that the circumferential (e.g. angular) velocity of the surface printing layer is not altered in passing through the nip. The uniformity of the velocity at which the printing surface passes through the nip is important to achieving web control (i.e. the printed material is not slipping relative to the rotating blanket) as well as to achieving good image resolution during rotation (i.e. no smearing of the image or distortion in the blanket surface).

Such antagonistic demands require a novel seamless, multi-layered printing blanket and method for making the same.

SUMMARY OF THE INVENTION

A novel multilayered sleeve-like printing blanket is mountable on gapless cylinders or tubular blanket cores, thereby minimizing vibration when operated at high rotational speeds.

An exemplary printing blanket comprises a seamless outer printing surface layer, at least one elastomer layer, and a resiliently compressible layer beneath said elastomer layer.

In another exemplary embodiment, the elastomer layer is reinforced by fibers that are substantially parallel to the inward and outward sides of the cylindrical tube defined by the reinforced elastomer layer when it is situated around the compressible layer. Accordingly, the reinforcing fibers are thereby oriented in a manner so as to reinforce the elastomer layer in the circumferential direction of rotation, thereby contributing to web control and image resolution. In further embodiments, the modulus of elasticity of the reinforced elastomer layer is at least 100 megapascals in the circumferential direction, and more preferably at least 200 megapascals.

In a preferred reinforced elastomer layer, a nonwoven mat of fibers is impregnated with an elastomer such that air bubbles or air voids are removed from the impregnating elastomer. An exemplary method for forming a reinforced elastomer layer is to wrap a full-width sheet of the impregnated nonwoven material at least two times around a compressible layer in a helical manner, and then curing the wrapped elastomer to form a continuous tube.

Another exemplary reinforced elastomer layer is formed by extruding an elastomeric material through a die, the elastomer having mixed therein fibers which are preferably longer than the narrowest dimension of the die opening, and preferably about 0.1–100 mm. in length. The reinforcing fibers will thus tend to be extruded in an orientation that reinforces the elastomer layer in the circumferential direction.

Further exemplary reinforced elastomer layers comprise at least two continuous filaments wound around the rotational axis of the printing blanket, and preferably at equal but opposite angles thereto. Still further exemplary reinforced elastomer layers are reinforced by a woven sleeve or knitted tube of material.

Further exemplary multi-layer blankets comprise optional compressible layers, elastomer layers, reinforced elastomer layers, woven fabric or knitted sleeve reinforced elastomer layers, and adhesive layers, as will be described with further particularity hereinafter.

Other exemplary embodiments of the invention include blanket/cylinder or blanket/carrier assemblies. For example, exemplary blanket/carrier assemblies comprise (1) a seamless multi-layered printing blanket having an outer printing layer, at least one elastomer layer reinforced with fibers that are oriented in a manner parallel to the inner and outer sides of the cylindrical tube defined by the reinforced elastomer layer, and a resiliently compressible layer; and (2) a tubular carrier comprising a rigid plastic, thermoplastic, or elastomeric material preferably having a high modulus, such as at least 200 megapascals or above. The carriers may be optionally reinforced with fibers.

A further exemplary blanket of the invention has a "pre-stressed" compressible layer which permits mounting of the seamless blanket around a cylinder without need for using a carrier. The inner diameter of the compressible layer has a smaller radius than the cylinder upon which it is to be mounted, and an elastomeric layer which is located radially around the compressible layer has a high modulus, preferably greater than 100 megapascals and more preferably greater than 200 megapascals, such that circumferential expansion of the compressible layer is limited.

Exemplary methods for making blankets and blanket/core assemblies of the invention include the steps of providing a cylinder, mandrel, or blanket core, and forming the tube-shaped layers thereupon, either by spiral-wrapping strips or by full-width wrapping of layer materials, or by extruding or coating the individual layers in a seamless fashion on the cylinder, mandrel, or blanket core in a continuous or discontinuous fashion.

In an exemplary method for making a blanket of the invention, a cellular or foamable layer is applied directly onto a cylinder, mandrel, or blanket core, which itself is being produced by an extrusion operation, or fed as a series of discreet length pieces in a manner that replicates a continuous length. This is then passed through a subsequent station where a fiber-containing elastomer is extruded through a circular die, or a filament layer or non-woven tape is wound thereabout, to build up the reinforced elastomer layer. A variety of exemplary methods are further described with particularity hereinafter.

DESCRIPTION OF THE DRAWINGS

Further characteristics and advantages of the invention will become more readily apparent when the following detailed description is considered in conjunction with the annexed drawings, provided by way of example, wherein:

FIG. 3 is a diagrammatic, partial cross-sectional view of an exemplary blanket of the invention mounted upon an exemplary carrier which, in turn, is mounted upon an exemplary cylinder;

FIG. 3*a* is an enlarged representational illustration of the reinforced elastomer layer of the blanket shown in FIG. 3;

FIGS. 4–7 are diagrammatic, partial cross-sectional views of further exemplary multilayered blankets of the invention;

FIG. 8 is a diagrammatic, partial cross-sectional view of an exemplary blanket/carrier assembly of the invention, in which a printing blanket is mounted upon an exemplary carrier;

DESCRIPTION OF PREFERRED EMBODIMENTS

Figure 1:
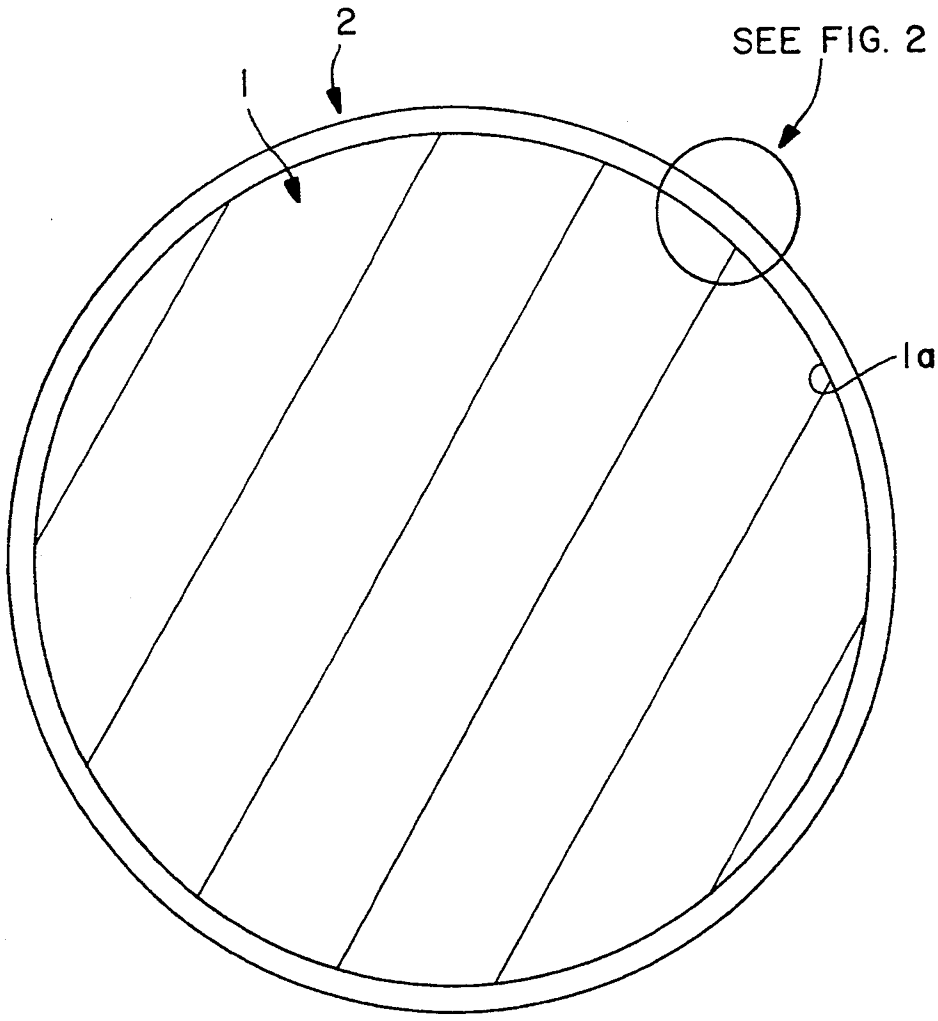
FIG. 1 is a diagrammatic cross-sectional view of an exemplary sleeve-like printing blanket of the invention mounted upon an exemplary cylinder.

FIG. 1 shows an exemplary blanket 2 of the invention which may be mounted around a cylinder 1 without any surface interruption in the manner of a sleeve. The cylinder 1 may be either solid or hollow in construction. The blanket or sleeve 2 can be fitted by any suitable methods onto the outer surface 1*a* of the cylinder 1 which, for example, may exhibit a diameter between 80 and 800 mm.

Figure 2:
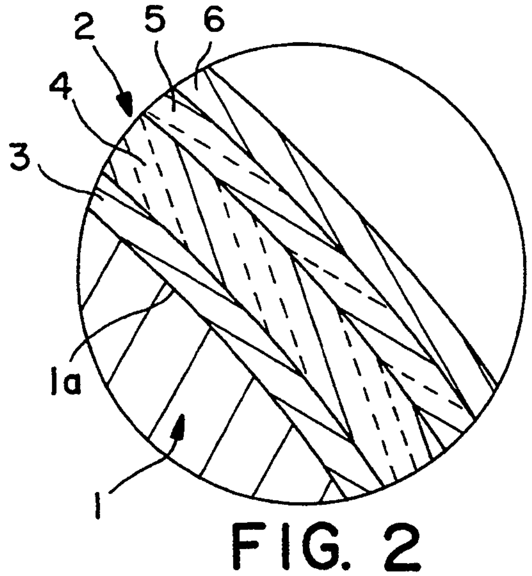
FIG. 2 is an enlarged cross-sectional view of the framed portion II of the blanket shown in FIG. 1.

FIG. 2 shows an exemplary sleeve 2 comprising an outer printing or lithographic layer 6, an elastomer layer 5, a resiliently compressible layer 4, and an adhesive layer 3 for adhering the blanket directly to the outer surface 1*a* of a cylinder 1. It is to be understood that the accompanying drawings are provided for illustrative purposes only, and are not drawn to scale or otherwise intended to indicate relative layer thicknesses.

The seamless outer lithographic or printing surface layer 6 may be formed in a sleeve- or tube-like shape of any suitable materials, such as natural or synthetic rubbers, known in the printing art; or they may be comprised of materials which are used or incorporated into the elastomer layer 5 or compressible layer 4, as described hereinafter. The surface layer 6 may have a radial thickness of 0.05 to 0.6 mm., although a range of 0.1 to 0.4 mm. is more preferred. The surface layer is preferably not foamed but void-free.

The resiliently compressible layer 4, which provides nip pressure, may be formed upon the outer surface 1*a* of a cylinder, mandrel, or carrier. The compressible layer 4 preferably comprises a foamed elastomeric material, such as cellular rubber, having a thickness preferably between 0.1 and 8.0 mm, and a modulus of elasticity preferably in the range of 0.2 to 100 megapascals (MPa). The percentage of volume of gas enclosed in the cells may be in the range of 10–80% by volume. The compressible layer 4 may be reinforced with fibers or the like. Suitable elastomeric materials include natural rubber, synthetic rubbers, such as nitrile rubber, polyisoprene, polybutadiene, butyl rubber, styrene-butadiene copolymers and ethylene-propylene copolymers, polyacrylic polymers, polyurethanes, epichlorohydrins, chlorosulfonated polyethylenes, silicone rubbers, fluorosilicone rubbers, or a combination thereof. Additional ingredients commonly added to rubber compositions such as fillers, stabilizers, pigments, bonding agents, plasticizers, crosslinking or vulcanizing agents, and blowing agents may be incorporated into the compressible layer, the preparation of which is known in the art. E.g., U.S. Pat. Nos. 4,303,721 and 4,812,357.

An exemplary method for fabricating exemplary compressible layers comprises the steps of applying (such as by coating, casting, extruding, wrapping or other known methods) a foamable material (e.g., nitrile rubber) which incorporates a blowing agent, and may also include other additives (such as reinforcing fibers) onto a cylinder, mandrel, or carrier, and then curing the material. For example, the foamable material may be cured using an autoclave which may be operated at temperatures, pressures, and with inert gases (e.g. nitrogen) as is customary within the art. The cured compressible layer 4 may be ground to achieve an appropriate thickness and uniform circularity. Alternatively, the foamable material may be cured after the addition of further layers, such as reinforced elastomer layers 5 and printing layers 6.

Elastomer layers 5 having substantially no air voids, and which do not therefore substantially compress when subjected to the customary pressures between nipped cylinders which would otherwise compress cellular rubber or foam layers, are sometimes referred to as "hard layers" or "hard elastomer" layers in the art. One of the purposes of the elastomer layer 5 is to provide web control and image resolution to the blanket during operation. The elastomer layer 5 is believed to accomplish this purpose by preventing bulges and undulations in compressible foam layers during operation. The elastomer layer 5 is also believed to provide dynamic stability such that the circumferential or angular velocity of the surface printing layer 6 is not altered in passing through the nip. Preferably, fibers are used to reinforce the elastomer layer 5 and to increase the stabilizing effect of the elastomer layer.

Particularly preferred blankets of the invention comprise at least one elastomer layer 5 reinforced by fibers which, as summarized above, tend to be oriented parallel to the inward and outward sides or walls of the cylindrical tube defined by the reinforced elastomer layer 5 when it surrounds the compressible layer 5. Thus, the oriented fibers provide reinforcement to the elastomer layer in the circumferential direction, i.e., the machine direction as the elastomer layer rotates around the axis of the printing blanket.

FIG. 3 diagramatically illustrates the cross-section of an exemplary multi-layer blanket 2 of the invention which comprises a printing layer 6, at least one elastomer layer 5 having reinforcing fibers therein, and a resiliently compressible layer 4. For illustrative purposes, the blanket 2 is shown mounted upon a carrier 10 using a layer of suitable adhesive 9, and the carrier 10, in turn, is mounted upon a cylinder 1 using an optional layer of suitable adhesive 3.

FIG. **3*a* provides an enlarged illustrative cross-sectional view (along the axial direction of the blanket) of the elastomer layer 5 shown in FIG. 3 in which the fibers are oriented substantially parallel to the inward and outward sides of the cylindrical tube defined by the reinforced elastomer layer. When the elastomer layer 5 is placed around a cylinder 1 or carrier 10, the fibers are therefore oriented so as to reinforce the elastomer layer in the circumferential direction of rotation. In preferred reinforced elastomer layers 5**, the modules of elasticity in the circumferential (i.e. machine) direction is at least 100 megapascals. More preferably, the modulus in the circumferential direction is at 200 megapascals.

Exemplary reinforced elastomer layers of the invention include polymeric materials which are considered curable or vulcanizable, i.e. they can be hardened or cured by the application of heat, radiation, curing agents, or other known means. Examples of such materials include natural rubbers, fluoroelastomers, SBRs (styrene butadiene rubber), EPDM (ethylene-propylene non-conjugated diene terpolymers), butyl rubbers, neoprenes, nitrile rubbers such as NBRs (nitrile butadiene rubber), polyurethanes, epichlorohydrins, chloroprenes, etc., or a mixture of the foregoing. Nitrile rubber is preferred.

Exemplary reinforcing materials may be formed of fibers or branched fibers ("fibrils") comprised of materials such as polyvinyl chloride, polyvinyl chloride copolymers, polyamides, aromatic polyamides, aramids, polyesters, polyolefins, vinylidene chlorides, or other fiber- or fibril-forming resins or a mixture of the foregoing. The fibers, whether in the form of continuous fibers (extending throughout the mat) or chopped fibers (e.g., 0.5–2.5 cms) may have a denier in the range of 1 to 100(d). Other suitable reinforcing fibers may comprise cellulose, cellulose derivatives, cotton fibers, rayon, metals, glass, carbon fibers, or a combination thereof.

An exemplary reinforced elastomer layer 5 is an elastomer-impregnated nonwoven mat. A suitable nonwoven, for example, comprises spunlaced aramid fibers having fibers with deniers up to 3d (E.g., SONTARA® Kevlar 2-11 118, 60 g/m$^2$). Other suitable mats are spunbonded nonwoven polyester having continuous fibers with deniers up to 50d (E.g. COLBACK® 50, a polyester nonwoven coated with polyamid 50 g/m$^2$).

Nonwovens are believed to provide uniform distribution of fibers, as well as an increase in the number and density of fibers. Nonwovens comprise continuous fibers or separate fiber strands which, when wrapped around the compressible layer 4, are oriented substantially parallel to the inward and outward sides of the cylindrical tube defined by the reinforced elastomer layer 5 and resist stretching in the circumferential direction (of rotation). These features help to provide stability and, in conjunction with the impregnating elastomer, to minimize vibration during operation, while permitting nip compression of underlying compressible layers. Nonwovens which comprise random-laid continuous spunbonded fibers that are melt-bonded together are among the preferred nonwovens contemplated for use in the invention. Preferably, the nonwoven comprises an aramid, polyamide, polyester, or a combination thereof, and has a modulus of at least 100 megapascals in the circumferential (i.e. machine) direction.

Figure 9:
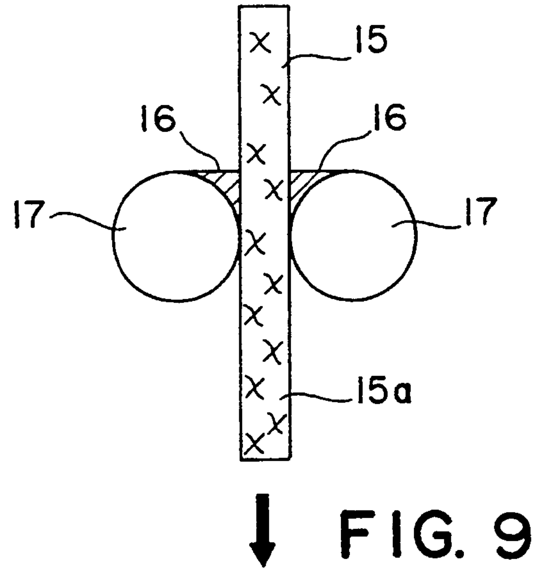
FIG. 9 is a representative view of an exemplary method of the invention wherein a nonwoven reinforcing material is impregnated with an elastomer.

FIG. 9 illustrates an exemplary method for impregnating a reinforcing nonwoven material 15 with an elastomer 16 to form a reinforced elastomer layer **15*a* which then may be wrapped around the compressible layer 4 to form a fiber reinforced elastomer layer 5 in the blanket 2. For example, nitrile rubber is dissolved in a solvent, such as toluene/methylchloride. The nonwoven 15, such as the Colback® 50 mat from AKZO, is drawn through an impregnating machine, represented by opposed cylinder 17, such that the rubber-based impregnant 16 is forced into open spaces of the nonwoven 15 so that substantially no air bubbles or voids remain therein. Two or more passes may be required to completely fill the open areas of the nonwoven 15. The viscosity of the impregnant 16 may be adjusted by using solvents to facilitate flowablity, depending upon the density or fiber characteristics of the particular nonwoven 15 being filled. After drying, the elastomer-impregnated nonwoven 15***a* may weigh about 400 gms/m$^2$. The elastomer 15*a* is wrapped onto the sleeve, then subsequently cured.

Figure 10A:
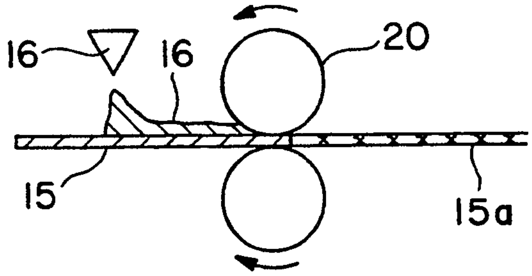
FIGS. 10*a* and 10*b* are representative illustrations of exemplary methods of the invention wherein a nonwoven reinforcing material is impregnated with an elastomer.
Figure 10B:
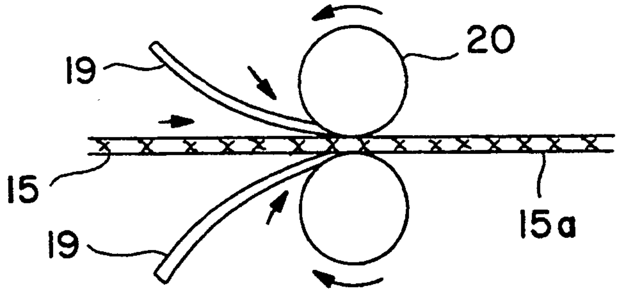

FIGS. 10*a* and 10*b* illustrate exemplary methods for producing an elastomer impregnated nonwoven 15*a*. The elastomer 16 may be extruded onto the nonwoven 15 as a thermally softened material and then forced into the interstices of the nonwoven 15 using opposed rollers 20 as shown in FIG. 10*a*. Alternatively, as shown in FIG. 10*b*, a preformed elastomer sheet or sheets 19 may be calendered using heated opposed rollers 20 to force the elastomer 19 into the nonwoven 15 as shown in FIG. 10*b*. The sheet-fed elastomer impregnant 19 (FIG. 10*b*) may be fed onto either or both sides of the nonwoven 15.

In a further exemplary fabrication method, the reinforced elastomer 5 may be formed by extruding the elastomeric material through a die or a number of parallel die openings. The extruded elastomer has mixed therein separate fibers having a strand length of 0.1–100 mm., whereby a substantial portion of fibers are substantially oriented parallel to the inward and outward sides of the cylindrical tube defined by the reinforced elastomer layer 5. Fiber-containing elastomer layers can also be formed by extrusion through an annular-shaped die around the compressible layer.

Figure 11:
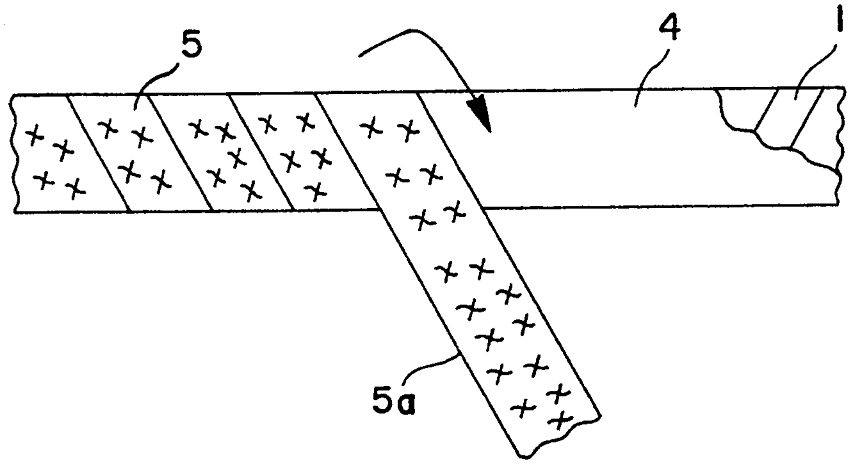
FIG. 11 is a representative view of an exemplary method for spiral-wrap forming of an exemplary reinforced elastomer layer of the invention.
Figure 12:
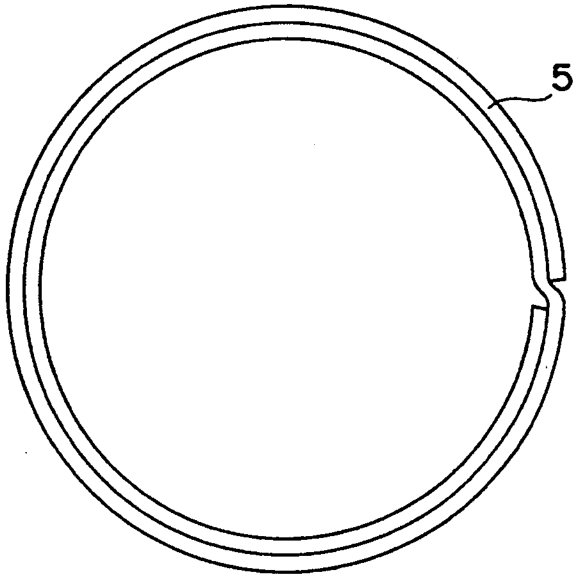
FIG. 12 is a cross-sectional view along the axial direction of an helically-wrapped exemplary reinforced elastomer layer of the invention (prior to curing of the elastomer).

FIG. 11 illustrates an exemplary method for fabricating exemplary fiber reinforced elastomer layers 5 of the invention. The method comprises the steps of providing a cylinder, mandrel, or blanket core 1, forming thereabout a resiliently compressible layer 4 (such as by any known methods), and spirally wrapping a strip of elastomer-impregnated fiber reinforced material 5*a* around the compressible layer 4 to form a tubular shape. The strip 5*a* is spirally-wrapped such that the edge of the strip 5*a* is adjacent to and directly abuts a previously wrapped strip. When cured, a continuous tube is formed. Alternatively, a tubular reinforced elastomer layer 5 may be formed by wrapping a full-width sheet of fiber reinforced elastomer circularly around the entire outer circumference of the compressible layer 4, and curing the layer 5 such that abutting edges are merged together. The cured reinforced elastomer layer may be ground to ensure uniform circularity if desired. FIG. 12 illustrates a preferred method for fabricating an exemplary fiber reinforced elastomer layer 5 whereby a full-width fiber reinforced elastomer layer is helically wrapped around a compressible layer (not shown) at least twice, such that a continuous tube is formed. The ends of the elastomer will tend to merge or meld into the layers in curing.

FIGS. 4–7 illustrate other exemplary multi-layered printing blankets of the invention. FIG. 4 shows two elastomer layers 5 and 7 disposed between printing surface 6 and compressible 4 layers. Either or both of the elastomer layers 5 and 7 may be reinforced. Preferably, when more than one elastomer layer is used under the outer layer 6, the outermost elastomer layer 7 is not fiber reinforced to ensure that the imprint of fibers (contained in layer 5) does not transmit through the outer printing layer 6. Use of at least two layers (FIG. 4) ensures uniformity and regularity in the event that the reinforcing material (e.g., nonwoven or separate fibers) is not elastomer-impregnated thoroughly such that air voids exist within the elastomer 5. The blanket 2 may be mounted upon a carrier and/or cylinder (such as shown in FIG. 3).

FIG. 5 shows another exemplary blanket 2 wherein at last three elastomer layers 7, 5 and 7*a* are used beneath the printing surface layer 6. Reinforcing fibers may be used in one or more of the layers 7, 5, and 7*a*, but it is preferred to use the fibers in the middle 5 of the three layers. The middle elastomer layer 5 could then have a thickness, for example, of 1 mm., while elastomer layers 7 and 7*a* may have a thickness of about 0.1 to 0.5 mm. The preferred use of unreinforced elastomer layers 7 and 7*a* on either side of reinforced elastomer layer 5 provides the benefit, as explained above, of ensuring print uniformity (which might otherwise be defeated by air voids in the nonwoven) and improving the bonding interface between layers. The blanket 2 may be mounted upon a carrier and/or cylinder (as shown in FIG. 3).

FIG. 6 shows a further exemplary multilayer blanket 2 of the invention comprising a first compressible layer 4, at last one elastomer layer 5 which is reinforced with fibers, a second compressible 4*b* layer, at least one elastomer layer 7 (optionally reinforced), and a printing surface layer 6. Further embodiments include a third elastomer layer between the second elastomer layer 7 and printing surface layer 6. The blanket 2 may be mounted upon a carrier and/or cylinder (as shown in FIG. 3).

FIG. 7 shows a further exemplary multilayer blanket 2 wherein a fabric layer 8 and a second compressible layer 4*b* are located between a first compressible layer 4 and reinforced elastomer layer 5. The blanket 2 may be mounted upon a carrier and/or cylinder (as shown in FIG. 3).

FIG. 8 shows an exemplary blanket/carrier assembly of the invention, wherein a blanket 2 having a printing surface layer 6, reinforced elastomer layer 5, and compressible layer 4, in a configuration specifically shown or taught elsewhere herein, is mounted around a tubular carrier or core 10. An adhesive layer (designated as at 3) is chosen depending upon the material which constitutes the carrier 10, as will be further explained hereinafter. An optional adhesive layer (not shown), preferably a pressure sensitive adhesive, may be placed on the inside of the carrier tube 10 for adhering the carrier to a cylinder.

Metal carriers are commonly used in the flexographic printing industry, and can comprise nickel, steel-nickel alloys, steel, aluminum, brass, or other metals. The inventors have discovered that such metal carriers can be used for offset printing blankets as contemplated in the present invention. Exemplary metal carrier walls should preferably have a thickness in the range of 0.01 to 5.0 mm. or more. An exemplary method of the invention would involve providing a metal carrier tube, such as one formed of nickel, mounting the carrier upon a mandrel, and forming the blanket layers directly upon the carrier.

The metal carrier surface is preferably first sandblasted to obtain a matted finish then degreased with a chlorinated solvent (e.g., 1,1,1 trichloroethane). The surface can be primed using commercially available primers, such as Chemosil® 211 from Henkel Chemosil of Dusseldorf, Germany, followed by one or more layers of adhesive, such as a nitrile rubber dissolved in an appropriate solvent (e.g., toluene and dichloromethane). A compressible foam layer 4 can then be fabricated thereabout by spiral-winding a strip or preferably by wrapping a full-width sheet of unfoamed elastomer material around the carrier, and then curing it so that abutting strip edges or wrap ends are merged together to form a seamless tube. Alternatively, a cross-head die can be used to extrude the foamable material about the carrier. The foamable layer can be cured by wrapping cotton or nylon strips around the unfoamed material, and then curing/foaming the material in an autoclave. The cotton wrapping is removed after curing, and the compressible layer may be ground to a desired thickness and to ensure uniform circularity. Alternatively, subsequent layers, such as one or more elastomer layers, can be formed around the unfoamed material and cured simultaneously with the foamable layer or layers.

Exemplary blankets of the invention may similarly be used with, or fabricated upon, nonmetal carriers. Thus, further exemplary carriers may be made of rigid plastic materials such as unplasticized polyvinyl chloride (PVC), polycarbonate, polyphenylene oxide, polysulfone, nylon, polyester, or a mixture thereof. Other exemplary carriers comprise thermoset material such as epoxies, phenolic resins, cross-linked polyesters, melamine formaldehyde, or a mixture thereof. Further exemplary carriers comprise elastomers such as ebonite, hard rubber, nitrile rubber, chloro-sulfonated rubbers, or a mixture thereof. Carriers may optionally be reinforced with fibrous materials, including chopped strand, nonwoven or woven mats, filament windings, or a combination thereof. Reinforcing fibers preferably comprise high modulus materials such as glass, metals, aramid fibers, or carbon fiber.

A further exemplary blanket/carrier of the invention may have a carrier comprising a prestretched heat-shrinkable material which may comprise, for example, polyethylene, polypropylene, or the like. The carrier may be formed as a tube comprising one or more layers of the heat-shrinkable material that is cross-linked, then stretched in a heated state, and quenched (e.g., cooled to retain stretched idmater). When placed around a cylinder, the tube carrier can be heated and thereby shrunk to obtain a tight compression fit around the cylinder.

The carrier tubes should preferably have an interference fit with the blanket cylinder in order to prevent slippage and subsequent misregister or doubling. The inside diameter of the carrier should by equal to or slightly less than the diameter of the cylinder shaft over which it will be fitted. The sleeve should preferably be resistant to creep and stress relaxation. To facilitate mounting on a cylinder, for example, metal carriers can be preheated to increase their effective diameter; and, after mounting, can be cooled to form a tight fit around the support shaft to minimize any potential vibration or movement.

Optionally, the ends of the cylindrical carrier tube may have appropriate notches or key ways to accommodate correspondingly shaped lugs, projections, or key ways on the cylinder shaft to facilitate driving of the carrier-mounted blanket 2 (such as shown in FIG. 8) and to eliminate slippage. Preferably, air pressure exerted between the inner surface of the sleeve and the outer surface of the mandrel or cylinder would by used to temporarily expand the sleeve to allow it to be slid or pulled over the mandrel or cylinder.

In exemplary blanket/carriers of the invention, the carrier tube has a longer length than the overlying blanket, such that the carrier extends longitudinally beyond one or both ends of the surrounding blanket. Thus, a clamping, keying, or locking device on the cylinder can be used to mechanically engage the longitudinally extended portion of the carrier tube to prevent slippage of the blanket/carrier relative to the rotating cylinder.

The thickness of the carrier should be made sufficient to withstand the stresses imposed by the desired blanket operation and the particular mounting mode or device used, e.g. air pressure mounting, expandable mandrel, end clamps or end journels, etc. Known methods and devices may be used for mounting the exemplary blankets and blanket/core assemblies of the invention. Typically, nickel carrier tubes may be about 0.12 mm thickness, while steel tubes may be about 0.15 mm. Rigid plastic carriers (e.g., unplasticized PVC) and hard elastomer carriers (e.g., ebonite) may be in the range of 0.5–2.0 mm, and preferably should have a modulus of elasticity of at least 200 megapascals.

It should be understood that filler layers may be used to build the thickness of cylinders, but such filler layers should not be confused with the exemplary carriers of the invention which facilitate mounting and dismounting of the blankets. Such filler layers could also be used, for example, between the innermost compressible layer and carrier to build blanket thickness.

Where individual layers of the exemplary blankets of the invention (e.g., layers 4–8) are not bonded together during fabrication (such as by being extruded on top of each other or by being cured together in an autoclave), they may be adhered together by any known adhesives which are customarily employed in bonding elastomers to metals, rigid plastics, fabrics, and to other elastomers (e.g., epoxies). Adhesive layers may also be employed between the blanket and cylinder (FIG. 1), between blanket and carrier (FIG. 3), and between the carrier and cylinder (FIG. 3).

Exemplary adhesives that may be used in exemplary blankets, blanket/cylinder and blanket/carrier assemblies of the invention include solvent-based systems employing synthetic elastomers (e.g. nitrile rubbers, neoprene, block copolymers of styrene and a diene monomer, styrene butadiene copolymers, acrylics); anaerobic adhesives (e.g. adhesives which harden in the absence of oxygen without heat or catalysts when confined between closely fitted parts) such as butyl acrylates and, in general, $C_2$–$C_{10}$ alkyl acrylate esters; epoxies, e.g. one-part resin adhesive systems, such as dicyandiamide (cyanoguanidine), or two-part systems employing a polyfunctional amine or a polyfunctional acid as the curative, or employing a cyanoacrylate); or a hot-melt adhesive such as polyethylene, polyvinyl acetate, polyamides, hydrocarbon resins, resinous materials, and waxes.

An exemplary adhesive layer which may be used on the inner surface of a compressible layer 4 or carrier tube 10 for mounting on a cylinder may comprise a pressure-sensitive adhesive to ensure easy assembly and removal of the blanket. Such adhesive can be, for example, a water-based acrylate/elastomer adhesive, which when dried to a thickness of up to 200 microns feels tacky and is pressure sensitive. Such adhesives are commercially available, from 3M, for example, under the tradename Scotchgrip® 4235. Another exemplary adhesive is polyurethane layer formed from polyisocyanate, elastomeric polyols and diol sprayed and cured on the cylinder or inner surface of the compressible layer or carrier. (Example: Adhesive formulation: Desmodur VL® (Bayer) 100 pbw, Capa 200® (Interox Chemicals Ltd.) 300 pbw, Bisphenol A 40 pbw.

Adhesives may also be encapsulated in a coating material which permits the blanket to be conveniently slid onto a cylinder or core, and which, when broken, crushed, dissolved, or otherwise ruptured, provides tackiness whereby rotational slippage of the blanket is minimized during operation. The encapsulating coating material may comprise, for example, a wax, protein, rubber, polymer, elastomer, glass, or a mixture thereof.

The adhesive may be a continuous layer or axially arranged in strips or beads (e.g., 2-5 mm. apart). Axially oriented beads or strips facilitates removal of a blanket from a cylinder or blanket carrier once the useful life of the blanket has expired. Cylinders as well as carriers tend to be expensive, and it is one of the purposes of the present invention to facilitate their reuse in subsequent operations.

In a further exemplary blanket of the invention, a reinforced elastomer layer 5 may comprise at least two filament layers which each comprise a continuous fiber strand wound around the axis of the blanket 2. The wound fiber of one layer is preferably wound around the rotational axis at an angle, preferably 20–85 degrees and more preferably 30–70 degrees. The fiber of the second layer is preferably wound at an angle equal to, and preferably opposite to, the angle at which the first fiber is wound. An exemplary method involves forming a compressible layer 4 around a cylinder, mandrel or blanket core, wrapping a continuous filament in a spiral fashion around the compressible layer, coating this first wrapping with an elastomer material, then wrapping a continuous filament in a spiral fashion preferably in the opposite direction along the cylinder, coating this second spiral wrapping with an elastomer material, and then curing these wrapped/coated layers by the appropriate methods, whereby a reinforced elastomer layer 5 is formed. The fibers and elastomers may be chosen from the materials described above.

A further exemplary reinforced elastomer layer 5 of the invention comprises a woven fiber or knitted sleeve impregnated with an elastomer material. The woven fabric or knitted sleeve may comprise any of the fiber materials described above, and preferably comprises a polyester, a polyamide, glass, carbon, metal, cellulosic materials, cotton, rayon, or a mixture thereof. The elastomer material may also be chosen from the group described hereinabove.

In further exemplary blankets of the invention, the compressible layer 4 may be "prestressed" such that exemplary multilayered blankets are especially suited for mounting upon cylinders without the use of carrier tubes and to provide added resistance to slippage of the blanket (See e.g., FIG. 2) during rotation. Preferably, the inner radial diameter of the compressible layer 4 is smaller than the cylinder 1 in order to define an interference fit, while a reinforced elastomer layer 5 which is located radially outward of and adjacent to the compressible layer 4 confines the outward expansion of the compressible layer 4. The modulus of elasticity of the reinforced elastomer layer 5 should preferably be at least 200 megapascals to accomplish this.

An exemplary method for fabricating the printing blankets described above comprises the steps of providing a cylinder 1 or blanket carrier 10, forming a continuous resiliently compressible layer 4 thereabout, such as by wet casting onto the cylinder or carrier a foamable rubber material; wrapping a fiber reinforced elastomer layer 5 around the compressible layer 4; and subsequently forming a surface printing layer 6 around the elastomer layer 5. Additional layers as described above may be formed also between any of these layers. Also, in exemplary blanket/carrier assemblies, it is preferable to apply the adhesive layer 3 onto the carrier 10. The adhesive 3 can be cured at the time the elastomer layer 5 is cured. As stated above, the compressible layer 4 may be separately cured and ground to ensure circularity prior to the formation of subsequent layers. Alternatively, the printing blanket may be formed on a mandrel by placing a polymeric release sheet around the mandrel, forming a compressible layer by coating a foamable material (or wrapping a dried but unfoamed material) onto the release sheet, and forming the reinforced elastomer layer 5, printing surface layers 6, and any additional layers around the compressible layer 4, and curing the layers simultaneously. After curing, the blanket can be removed from the mandrel, and the release sheet removed when it is desired to install the blanket around a cylinder or carrier.

A further exemplary blanket fabrication method comprises the steps of continuously extruding a blanket carrier, which may comprise plastic or elastomer materials as described above and may be optionally reinforced with fibers; wet casting or extruding a foamable material around said extruded core by using an annular-shaped die; forming a reinforced elastomer layer 5 around said compressible layer 4 by continuously wrapping an elastomer-impregnated nonwoven thereabout, or, alternatively, extruding a fiber-containing elastomer around the compressible layer 4, preferably in a circumferential direction; and forming the printing surface layer around the reinforced elastomer. The printing blanket is then cured, such as by using an autoclave.

As modifications or variations of the foregoing examples, which are provided for illustrative purposes only, may be evident to those skilled in the art in view of the disclosures herein, the scope of the present invention is limited only by the appended claims.

It is claimed:

1. A multilayered, printing blanket sleeve comprising:

a seamless outer printing surface layer;

at least one reinforced elastomer layer beneath said seamless outer layer, said reinforced elastomer layer being a cylindrical tube having inward and outward sides and being reinforced by fibers that are substantially parallel to said inward and outward sides; and a resiliently compressible layer surrounded by said at least one reinforced elastomer cylindrical tube layer, said compressible layer having a modulus of elasticity in the range of 0.2 to 100 megapascals; said seamless printing surface layer, said at least one reinforced elastomer layer, and said resiliently compressible layer having an axially symmetrical tubular shape.

2. The printing blanket sleeve of claim 1 further comprising at least two elastomer layers between said outer printing surface layer and said compressible layer, at least one of said elastomer layers being reinforced with fibers.

3. The printing blanket sleeve of claim 1 wherein said reinforced elastomer layer comprises a nonwoven mat of fibers impregnated within an elastomer.

4. The printing blanket sleeve of claim 3 wherein said nonwoven mat is a spunbonded or spunlaced nonwoven comprising continuous fibers.

5. The printing blanket sleeve of claim 1 wherein said elastomer layer comprises a natural rubber, fluoroelastomer, styrene butadiene rubber, ethylene-propylene diene terpolymer, butyl rubber, neoprene, nitrile rubber, polyurethane, epichlorohydrin, chloroprene, or a mixture thereof; and said reinforcing fibers are comprised of a polyvinyl chloride, polyvinyl chloride copolymer, polyamide, aromatic polyamide, aramid, polyester, polyolefin, vinylidene chloride, thermoplastic resin, cellulose, cellulosic derivative, cotton, rayon, metal, glass, carbon fibers, or a combination thereof.

6. The printing blanket sleeve of claim 5 wherein said reinforced elastomer comprises aramid fibers, polyamide fibers, polyester fibers, or a mixture thereof, said fibers being impregnated with nitrile rubber.

7. The printing blanket sleeve of claim 1 further comprising a tubular carrier comprising a material selected from the group consisting of nickel, steel, steel-nickel alloy, brass, aluminum, unplasticized polyvinyl chloride, polycarbonate, polyphenylene oxide, polysulfone, nylon, polyester, epoxies, phenolic resins, cross-linked polyesters, melamine formaldehyde, hard rubber, ebonite, or a mixture thereof.

8. The printing blanket sleeve of claim 1 further comprising a tubular carrier formed from a material selected from the group consisting of unplasticized polyvinyl chloride, polycarbonate, polyphenylene oxide, polysulfone, nylon, polyester, or a mixture thereof.

9. The printing blanket sleeve of claim 1 further comprising a tubular carrier comprising material selected from the group consisting of ebonite, hard rubber, nitrile rubber, chloro-sulfonated rubber, or a mixture thereof.

10. The printing blanket sleeve of claim 7 wherein said carrier is reinforced with fibrous material selected from the group consisting of chopped strand, nonwoven mats, woven mats, and filament windings.

11. The printing blanket sleeve of claim 1 further comprising a tubular carrier formed of a heat-shrinkable material.

12. The printing blanket sleeve of claim 6 further comprising a layer of adhesive operative to mount said blanket onto a cylinder or blanket carrier.

13. The printing blanket sleeve of claim 12 wherein said adhesive comprises a solvent-based adhesive, an anaerobic adhesive, an acrylate-based adhesive, an epoxy-based adhesive, or a hot-melt adhesive.

14. The printing blanket sleeve of claim 7 further comprising an adhesive disposed on said carrier and operative to adhere said carrier to a cylinder.

15. The printing blanket sleeve of claim 14 wherein said adhesive is a pressure-sensitive adhesive.

16. The printing blanket sleeve of claim 15 wherein said adhesive is encapsulated in a coating material.

17. The printing blanket sleeve of claim 7 wherein said carrier tube is longer than said blanket.

18. The printing blanket of sleeve of claim 1 wherein said reinforced elastomer layer is formed by extruding an elastomeric material through a slot-shaped die, said elastomer having mixed therein fibers having a length of 0.1–100 mm. whereby a substantial portion of fibers are oriented parallel to the inward and outward sides of the cylindrical tube defined by the elastomer layer when situated around said compressible layer.

19. The printing blanket sleeve of claim 1 wherein said reinforced elastomer layer comprises at least two layers each comprising a continuous filament wound around the rotational axis of the printing blanket.

20. The printing blanket sleeve of claim 1 wherein said reinforced elastomer layer comprises a woven fabric or knitted sleeve.

21. A multilayer, printing blanket sleeve, comprising:

a multi-layer, seamless, axially symmetrical tubular structure having an outer printing surface layer; at least one elastomer layer located beneath said printing surface layer; a first compressible layer located beneath said at least one elastomer layer; a fiber reinforced elastomer layer located beneath said first compressible layer, said reinforced elastomer layer being a cylindrical tube having inward and outward sides and being reinforced by fibers that are substantially parallel to said inward and outward sides; and a second compressible layer located beneath said reinforced elastomer layer, at least one of said compressible layers having a modulus of elasticity in the range of 0.2 to 100 megapascals.

22. The printing blanket sleeve of claim 21 further comprising at least two elastomer layers beneath said outer printing layer and above said first compressible layer.

23. The printing blanket sleeve of claim 21 wherein said elastomer layer located beneath said outer printing layer and above said first compressible layer is reinforced by fibers.

24. The printing blanket sleeve of claim 1 wherein said blanket is mounted around a cylinder.

25. The printing blanket sleeve of claim 24 wherein the inner radial diameter of said compressible layer is smaller than the diameter of said cylinder, and said reinforced elastomer layer has a modulus of at least 200 megapascals.

26. The printing blanket sleeve of claim 1 wherein said reinforced elastomer layer comprises a nonwoven which has been impregnated with an elastomer by pressing a sheet of thermally softened elastomer into said nonwoven, such that substantially no air voids remain therein.

27. A multilayered, printing blanket sleeve, comprising: a seamless outer printing surface layer; at least one reinforced elastomer layer beneath said seamless outer layer, said reinforced elastomer layer being a cylindrical tube having inward and outward sides and being reinforced by fibers that are substantially parallel to said inward and outward sides; a resiliently compressible layer surround by said reinforced elastomer layer, said compressible layer having a modulus of elasticity in the range of 0.2 to 100 megapascals; said seamless printing surface layer, said at least one reinforced elastomer layer, and said resiliently compressible layer having an axially symmetrical tubular shape; and a tubular carrier located axially inward of said resiliently compressible layer.

28. The blanket sleeve of claim 27 wherein said tubular carrier comprises a metal carrier.

29. The blanket sleeve of claim 27 wherein said tubular carrier comprises a non-metal carrier.

* * * * *